No. 769,932. PATENTED SEPT. 13, 1904.
G. W. BAIER.
CAKE OR DOUGHNUT CUTTER.
APPLICATION FILED SEPT. 26, 1903.
NO MODEL.
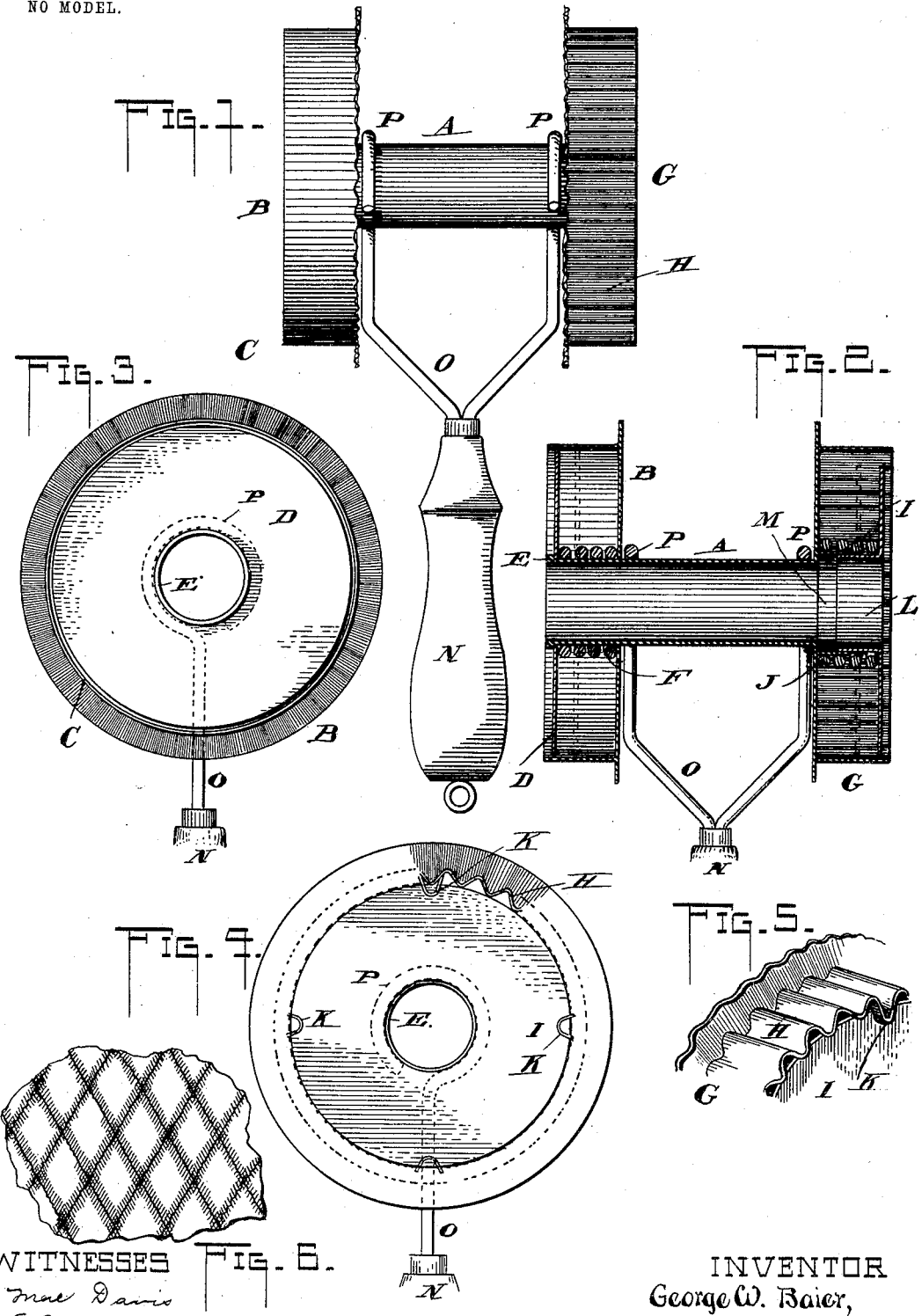
WITNESSES
INVENTOR
George W. Baier, No. 769,932. Patented September 13, 1904.

UNITED STATES PATENT OFFICE.

GEORGE W. BAIER, OF CISSNAPARK, ILLINOIS.

CAKE OR DOUGHNUT CUTTER.

SPECIFICATION forming part of Letters Patent No. 769,932, dated September 13, 1904.

Application filed September 26, 1903. Serial No. 174,833. (No model.)

*To all whom it may concern:*

Be it known that I, GEORGE W. BAIER, a citizen of the United States, residing at Cissnapark, in the county of Iroquois and State of Illinois, have invented certain new and useful Improvements in Cake or Doughnut Cutters; and I do hereby declare that the following is a full, clear, and exact description of the invention, which will enable others skilled in the art to which it appertains to make and use the same.

This invention relates to an improvement in utensils for cutting cakes, cookies, and doughnuts.

An object of the present invention is to provide a device of the character named that may be used for cutting out cakes of various forms of outline.

Another object is to furnish a device with means for ejecting the cut dough from the cutting member.

Still another object is to make a rotary cutter by which cakes of differing shapes may be readily cut.

In the appended drawings, Figure 1 is a top view of the improved cutter when used as a rotary device. Fig. 2 is a longitudinal section of the same. Fig. 3 is a view of one end of the cutter. Fig. 4 is a view of the opposite end thereof. Fig. 5 is a perspective view of a portion of the end shown in Fig. 4, showing its crimped cutting edge and part of an ejecting plate or disk. Fig. 6 is a view of a piece of dough, showing manner of cutting the same with the device when used as a rotary cutter and which illustrates the serrated edge and corrugated surface of the cut cakes.

A illustrates a hollow shaft carrying at each end a head, one of which is indicated by B, and consists of a cup-shaped portion cut out to pass over the shaft where it may be secured by soldering or other good means, allowing the end of the shaft to project through the head flush with the outer edge of said head, as shown in Fig. 2. The wall of the head, as illustrated in Fig. 3, is a perfect circle, being indicated by the letter C. Within the cup or head thus constructed is a disk D, having a hole therethrough through which the shaft extends. Said disk lies slightly within the head and is prevented falling out by an enlargement E on the end of said shaft. Surrounding the shaft within the head or cup B is a spiral spring F, one end of which bears against the disk and the other against the head, as indicated in Fig. 2. The spring, which has an opening tendency, serves to keep the disk D against the enlargement of the shaft, as will be understood. The head G at the opposite end of the shaft A has its wall corrugated, as shown at H in Figs. 4 and 5, and corresponds with the wall C of the head B. Within this head is also a disk, (indicated at I,) which is held outward by a spring J, similar to F in the head B. In order to provide a stop for this disk I, an inwardly-extending lip K is formed on or secured to one of the corrugations or crimps H, as shown in Figs. 4 and 5. In the former figure are shown four of these projections, which form a seat for the disk, so that the spring J will force said disk against them and will be held firmly. In the head G the shaft A is cut off, and the disk I, just described, has an inwardly-extending tubular portion L, designed to slide within a short tubular extension M, secured in the head, as illustrated in cross-section. The two tubular portions thus serve to guide the disk I in its movements. The two facing walls of the heads B and G are crimped or corrugated, as shown in Figs. 1 and 5, the purpose of which will presently be shown. A handle N is provided for the device and has a forked wire O, having a loop P formed at each extremity, which incloses the shaft, as indicated in broken lines in Fig. 3.

In use the implement is designed to cut out the dough by pressure of one or the other of the heads thereon or by rolling it by means of its handle. If it is desired to cut out round cakes with a hole in the center thereof, the head B is employed, which if placed with the disk D in a horizontal position to bring the cutting edge C upon the dough will cut out the cake. In doing this the disk is pushed into the head by the pressure of the dough thereagainst. Now when the cutter is raised the spring F instantly returns said disk to its normal or initial position, with the result that the dough is ejected from the cup, so that the next cake may be at once cut without delay and without the necessity of removing each one, as in the old-style cutters. When it is desired to cut a cake with a crimped or serrated edge, the head G is used, the results being the same as before described. In this form the cakes have no holes in their centers. It will be observed that the crimped or corrugated portions of the heads B and G form flanges which project beyond the cutting-walls of said heads, and these flanges are employed as cutters when handling the device by means of the handle N. When square or diamond-shaped cakes are to be cut, the device is placed upon the molding-board with both said flanges lying upon it. Now by means of its handle the device is run across the dough, with the result that the flanges cut through it, the cuts made thereby being of a zigzag form corresponding with the crimp of the cutting edges. It is designed that when cutting through the slab of dough the crimped wall of the head G will bear upon it and leave a corrugated surface. This idea is shown in Fig. 6, in which the cutter has been pushed across the dough in two directions, so as to form diamond-shaped cakes. The marks crossing the zigzag lines indicate the corrugations made by the said head G. It is evident that square cakes or, in fact, any form of cake having a straight edge may be formed by this manner of using the device.

As the device is constructed according to the drawings, the crimped flanges would have to retrace the cuts formed after the first passage over the dough after reversing the direction of movement in order that the corrugations can be placed on each edge of the individual cake as formed. It will be seen that if the cutter is run in one direction only only every other tier or line of cakes will be crimped; but if the heads are both crimped by simply retracing the cuts by putting the right-hand flange into the cut formed by the left-hand one the desired result will obtain.

It is to be understood that both heads may be formed the same as B or both may be made the same as G, and many other changes may be made without departing from the desire and intent of the invention. The head B may be used for cutting out doughnuts as well as cakes, the wall C and the end of the shaft A forming the ring or circle, the usual form for this class of pastry.

I claim—

1. A cake-cutter comprising two heads adapted to revolve in a vertical plane, a shaft connecting them, a crimped cutting edge for each head for cutting dough in a continuous zigzag line, in combination with a rim for each head parallel with the shaft, each rim forming a cutting member for cutting the dough in circular disks and ejecting-plates within the rims for ejecting the dough cut by said rims as set forth.

2. A cake-cutter comprising cup-shaped heads adapted to revolve in a vertical plane, a hollow shaft for connecting and carrying them, a vertical crimped cutting edge for each head, for cutting dough and having continuous serrated edge thereon, a rim on each head parallel with the shaft for cutting disks of dough, the said hollow shaft extending through the heads flush with the said rims for cutting holes in the disks of dough and a spring-actuated ejecting-plate for each head substantially as described.

3. In a cake and doughnut cutter, the shaft A, the heads B and G thereon, one at each end, a handle N for carrying and permitting a revoluble movement of the cutter for the purposes explained, cutting members for cutting the dough, crimped portions for forming corrugations on the surface of the dough, a cutter for stamping out cakes of various shapes and means for ejecting the dough from the cutter after being cut substantially as set forth.

In testimony whereof I affix my signature in presence of two witnesses.

GEORGE W. BAIER.

Witnesses:
H. B. HARVEY,
T. WAYNE YOUNG.